United States Patent [19]

Aprato

[11] 4,439,777

[45] Mar. 27, 1984

[54] THERMAL SERIAL DOT PRINTER

[75] Inventor: Armando Aprato, Lugnacco, Italy

[73] Assignee: Ing. C. Olivetti & C., S.p.A., Ivrea, Italy

[21] Appl. No.: 332,102

[22] Filed: Dec. 17, 1981

[30] Foreign Application Priority Data

Dec. 23, 1980 [IT] Italy ............................ 68970 A/80

[51] Int. Cl.[3] ............................ G01D 15/10

[52] U.S. Cl. ............................ 346/76 PH; 400/120

[58] Field of Search ............................ 346/76 PH; 219/216; 400/120

[56] References Cited

U.S. PATENT DOCUMENTS

| | | | |
|---|---|---|---|
| 3,987,882 | 11/1976 | Kobryn | 400/120 |
| 4,013,159 | 3/1977 | Ohabe | 400/120 |
| 4,034,842 | 7/1977 | Giacone | 400/317.1 |
| 4,130,752 | 12/1978 | Conta et al. | 219/216 |
| 4,300,844 | 11/1981 | Keil | 219/216 |

*Primary Examiner*—E. A. Goldberg
*Assistant Examiner*—Todd E. DeBoer
*Attorney, Agent, or Firm*—Banner, Birch, McKie & Beckett

[57] ABSTRACT

The printer comprises a thermal print head on the rear side of a plate (54) carried by a carriage (27) and cooperating with a bar (83) which is pivoted on an axis (88) in such a manner as to adapt its angular position to the surface of the head, on the basis of the thickness of the paper. The paper is fed by two rollers (9 and 10) which are rotated in a differential manner in order to keep the paper under tension. One of the rollers is mounted on an eccentric (92) to enable the parallelism of the two rollers to be adjusted. The head (53) is removably mounted on the carriage (27) and is connected to a connector by way of a flexible ribbon cable (64) which is connected to the head (53) by way of a flexible cable in the form of conductor rings compressed between the conductors at the end of the cable and printed conductors on an alumina plate (56) cemented to the plate (54).

1 Claim, 3 Drawing Figures

THERMAL SERIAL DOT PRINTER

BACKGROUND OF THE INVENTION

This invention relates to a thermal serial dot printer, in which a thermal head is carried by a carriage movable relative to the paper, which is supported by a flat bar, the head comprising a flat support carrying a column of thermal printing elements disposed on a column transverse to the paper movement.

In known printers, the thermal head is generally carried by a frame pivoted on a shaft, and urged resiliently towards the paper in such a manner as to ensure good contact between the thermal elements and the paper.

The plane of the bar is generally fixed in such a manner that for a determined paper thickness it is parallel to the plane of the head. In the case of dot printing, for example in accordance with normal 7×5 dot matrices, because of the relatively limited length of the column of thermal elements, which is equal to the character height, and because of the quality required of the printing, any parallelism error between the head support plane and the plane of the paper therefore has negligible influence on the printing.

In the case of heads with a large number of dots, such as high definition printing heads or heads designed for printing very tall lines, for example for facsimile transmission apparatus, a small parallelism error causes unacceptable non-uniformity in the printing, so that known printers are not suitable for such purposes.

The technical problem which the invention proposes to solve is to create a thermal printer of the aforesaid type, in which the printing uniformity is independent of the number of thermal elements of the column.

SUMMARY OF THE INVENTION

According to the invention, it is now provided a thermal serial dot printer, in which a thermal head is carried by a carriage movable transversely to the paper, which is supported by a flat bar, the head comprising a flat support carrying a set of thermal printing elements disposed on a column transverse to the paper movement, wherein the flat bar is pivoted about an axis which is parallel to the carriage motion and lies substantially along the centre line of the height of the bar, so as to allow its position to adapt automatically to the support for the thermal elements.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
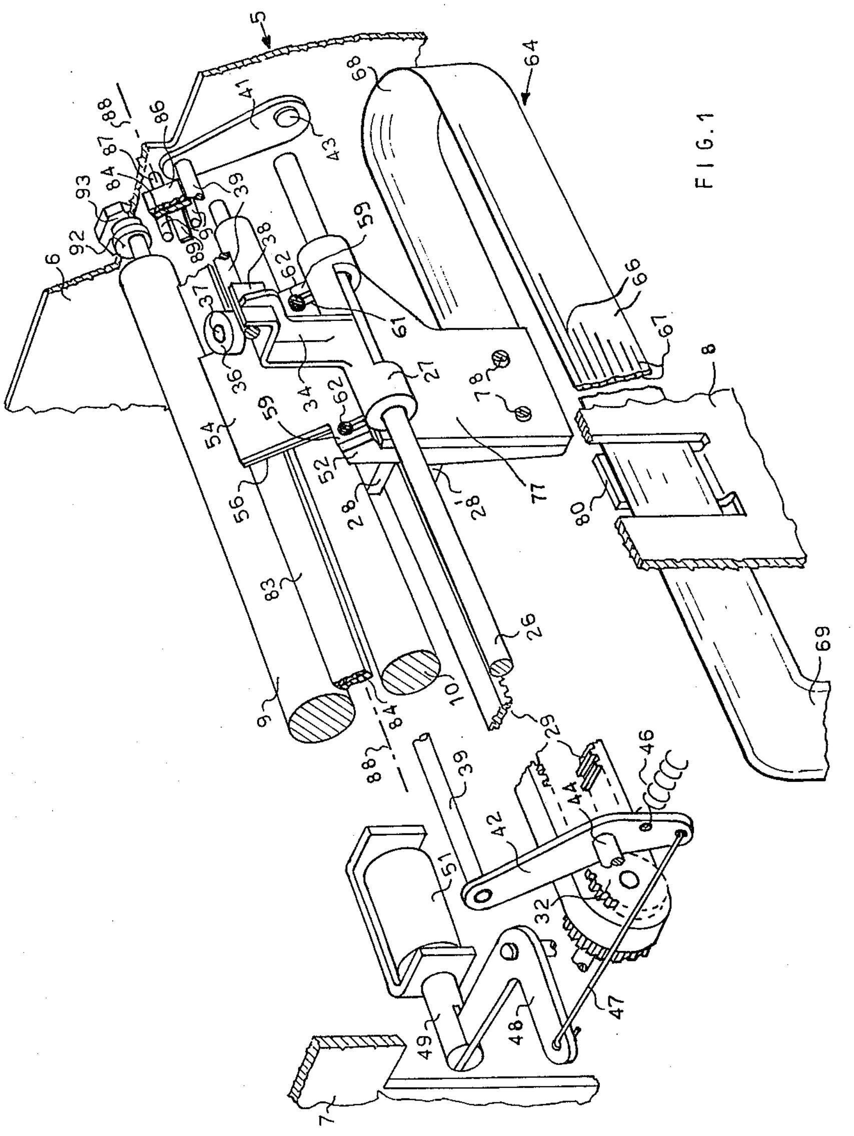
FIG. 1 is a diagrammatic perspective view of a printer embodying the invention.

A fixed printer frame 5 comprises two side plates 6 and 7 connected together by a set of cross members 8. Two rollers 9 and 10 (FIG. 2) are rotatably mounted on the two side walls 6 and 7, and a paper strip 11 is taut over the rollers. The strip unwinds from a roll 12 and is guided by a spring-loaded tension roller 13 carried by a frame 14 pivoted on a fixed shaft 16. The paper 11 is kept in contact with the two rollers 9 and 10 by two sets of paper pressing rollers 17 and 18. The rollers 17 are carried by a spring-loaded bar 19 supported by two arms 20 pivoted on two pins 21. The two arms 20 are connected together by a serrated cross member 22 for tearing off the paper 11. The rollers 18 are mounted on a spring-loaded paper guide plate 23 pivoted on two pins 24.

The rollers 9 and 10 are rotated simultaneously in order to feed the paper 11 perpendicularly to the line of print. In order to keep the paper 11 under tension, the upper roller 9 is rotated by a belt 15 (FIG. 3) at a greater rate than the roller 10 in the manner described in U.S. Pat. No. 4,034,842 assigned to the same Assignee.

A plastics carriage 27 is slidable transversely on a shaft 26 fixed between the two side walls 6 and 7, and is provided at the rear with two lugs 28 and 28' between which is fixed a portion of a toothed belt 29 wound about two pulleys 31 and 32 (see also FIG. 1). The pulley 31 is rotated by a reversible electric motor 33 in such a manner as to cause the carriage 27 to move the reciprocating motion transversely to the paper 11.

The carriage 27 is also provided with an upstanding cranked arm 34 on which there is pivoted a roller 36 rotatable on a vertical pin 37. The arm 34 is also provided with an upwardly bent lug 38 which together with the roller 36 engages with a transverse bar 39 carried by two arms 41 and 42 (FIG. 1). These are pivoted on two fixed pins 43 and 44 on the side walls 6 and 7, and are urged in an anticlockwise direction by a spring 46.

The arm 42 is connected by a tie rod 47 and a cranked lever 48 to the armature 49 of an electromagnet 51, which is energised in order to cause the arms 41 and 42 to rotate against the action of the spring 46 and withdraw the carriage 27 from the paper 11 during the idle travel of the carriage 27.

The carriage 27 also comprises a flat portion 52 on which a thermal printer head 53 is fixed. More specifically, the head 53 comprises a support formed from a substantially rectangular plate 54 of aluminium alloy, on which an alumina plate 56 is cemented. A set of conductors 57 (FIG. 3) is deposited thereon by the thick film method, and can be individually activated in order to supply a column of thermal or resistive elements 58 which will be described hereinafter.

The plate 54 (FIG. 3) is provided with two lugs 59, each with a downwardly facing slot 61. The head 53 is removably fixed on the portion 52 of the carriage 27 by a pair of screws 62, which engage the slots 61 and screw into two bores of the portion 52.

Figure 2:
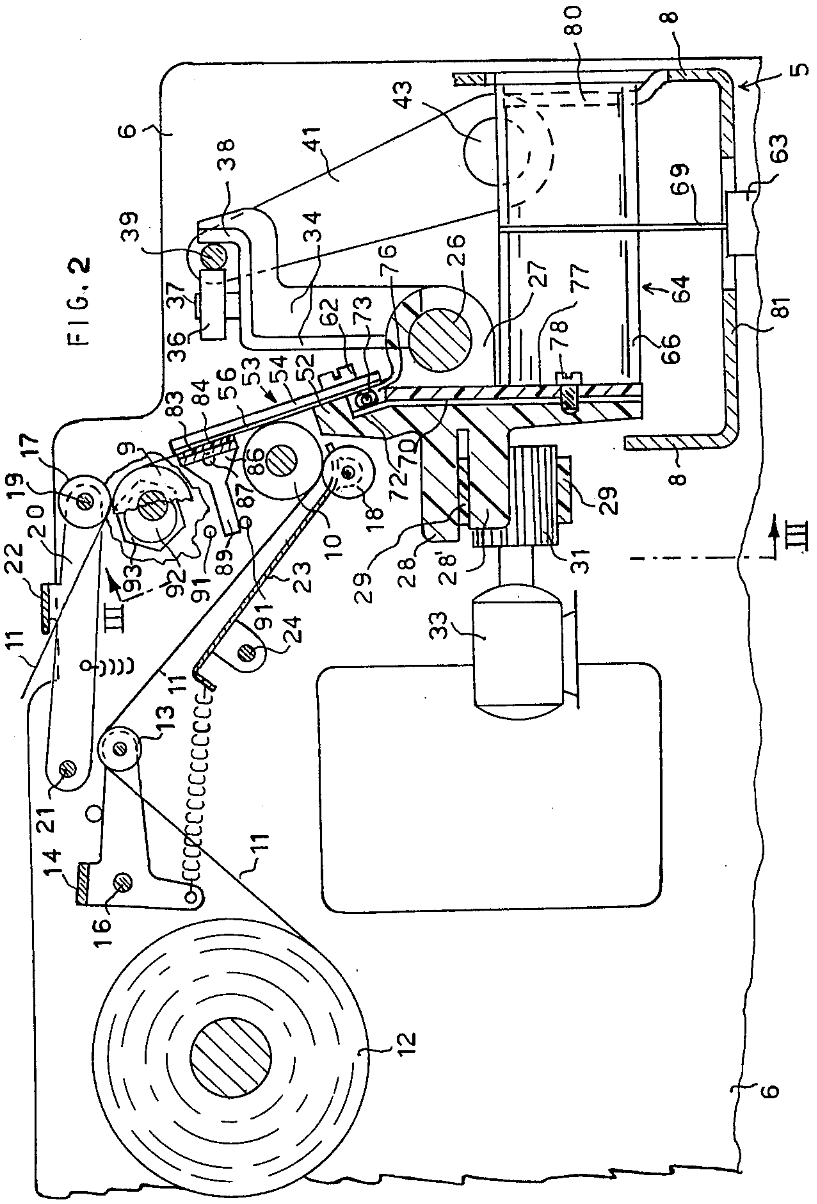
FIG. 2 is a cross-section through the printer of FIG. 1 to larger scale.

The conductors 57 are connected to a set of contacts of a connector 63 fixed on the frame 5 by means of a multiple flexible ribbon cable 64. This is constituted by a set of copper conductors 66, for example having a thickness of 40–60$\mu$, embedded into two layers of Kapton 67 having a thickness of 20–40$\mu$. The ribbon 64 comprises a rectangular portion 68 having a length substantially greater than the width of the printer, and two terminal portions 69 and 70 which extend perpendicular to the portion 68. The portions 69 and 70 have edges 71 and 72 respectively (FIG. 3) which are parallel to the long side of the portion 68, and at which the conductors 56 are exposed at each end through the layer of Kapton 67. The edge 71 is soldered in known manner to the conductors of the connector 63. The edge 72 is removably connected to the conductors 57 of the head 53 by way of a flexible cable 73 (FIG. 2). This cable is constituted by a set of conductor rings 74 (FIG. 3) spaced apart by between 0.15 and 0.3 mm, and embedded in a flexible plastics tube 76 so as to leave the outer surface of the rings 74 exposed. Consequently, at each conductor 57 of the head, of which the pitch lies between 0.6 and 0.7 mm, and thus at each conductor 66 of the flexible ribbon cable 64, there are always at least two rings 74 of the cable 73. This is disposed between the cable portion 70 and the conductors 57, the cable portion 70 being clamped in place by a cross member 77 fixed by two screws on the carriage 27. The head 53 can be replaced easily without the need for bulky connectors on the carriage 27.

The rectangular portion 68 of the ribbon cable 63 is guided between a lug 80 on the front cross member 8 and the adjacent parts of this member. The cable is folded in two and is housed in a compartment formed between two front cross members 8 and a horizontal cross member 81 of the frame 5, so that it does not interfere with other mechanisms during the movement of the carriage 27.

Figure 3:
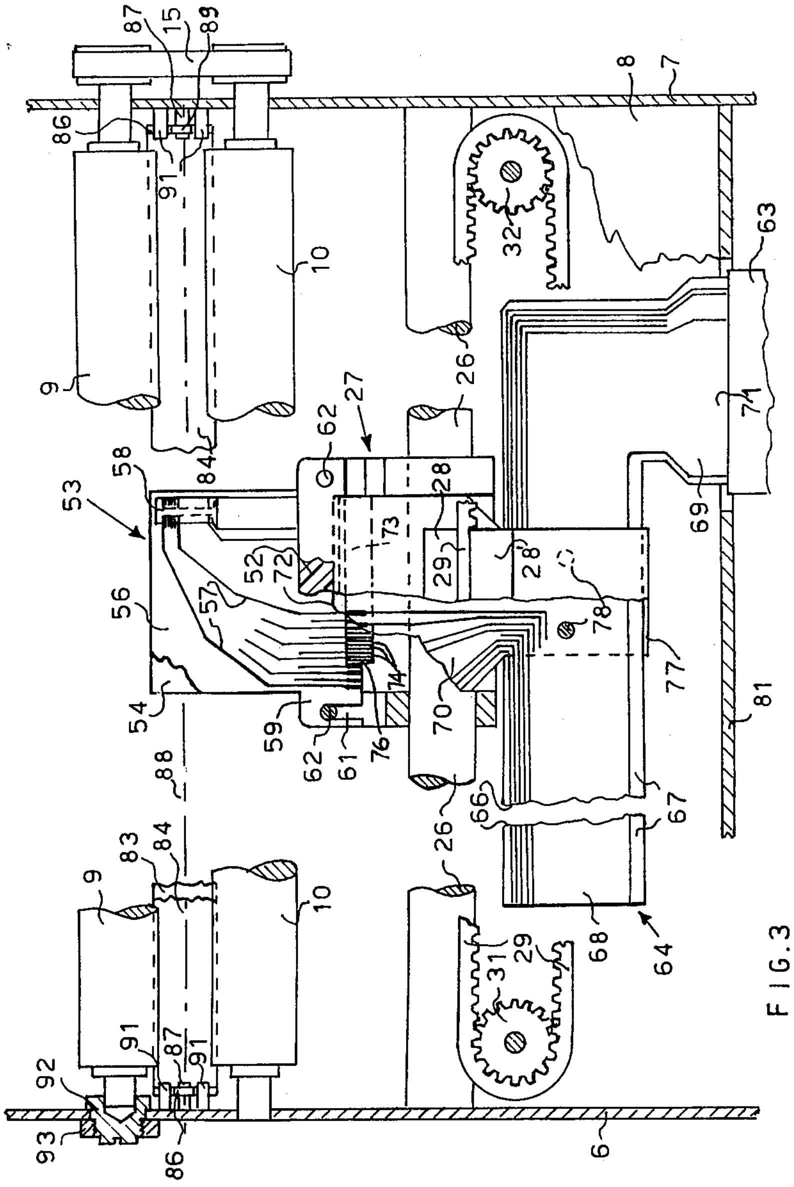
FIG. 3 is a front view of the printer carriage.

The head 53 is designed for a large number of thermal elements 58 (FIG. 3). For example, the head 53 is designed for printing in a facsimile transmission apparatus, in which for each stroke of the carriage 27 it is required to reproduce in 40 msec. a line having a height of 12.5 mm in accordance with a dot matrix comprising 3.85 dots per mm, so that the head 53 comprises 48 slots. The paper 11 is supported at the printing line by a flat bar 83 (FIG. 2) disposed between the two rollers 9 and 10 and parallel thereto. More specifically, the bar 83 is of a substantially rigid material and is fixed on to a metal cross member 84. This is fixed at its two ends on two arms 86 (FIG. 3) pivoted on two fixed pins 87, which are disposed along an axis 88 parallel to the rollers 9 and 10 and passing along the centre line of the front surface of the bar 83. In this manner, when the head 53 (FIG. 2) rests against the paper 11, the bar 83 adapts its angular position in such a manner that it becomes disposed in a direction perfectly parallel to the plane of the head 53, so that contact between the thermal elements 58 and the paper 11 is uniform, regardless of the thickness of paper.

The two arms 86 (FIG. 3) are each provided with a tongue 89 (FIG. 2) which copperates with two fixed stops 91 carried by the corresponding side wall 6 and 7, so that its rotation in one direction and the other is limited.

Finally, the upper roller 9 is pivoted on the side wall 6 by means of an eccentric bearing 92 which can be fixed on to the side wall 6 in an angular position which is adjustable on slacking off a lock nut 93. Consequently, any misalignment of one of the rollers 9 and 10 relative to the other, or any lack of parallelism which tends to cause the paper 11 to move at an angle to the predetermined direction, can be corrected by adjusting the angular position of the eccentric bearing 92 for the roller 9.

Various modifications and improvements can be made to the described printer without leaving the scope of the invention as claimed. For example, the printer can be designed for high definition printing, for example in accordance with a dot matrix comprising 7.7 to 8 dots/mm, or for printing oriental languages such as Kangi, or for facsimile reproduction. In this latter case, the carriage 27 can carry a scanning device arranged to read in one pass a number of lines which is a sub-multiple of the number of thermal dots of the head 53, for example 16 lines. The facsimile apparatus would then be provided with means for storing the signals of two scanning operations, and for feeding them to the printer simultaneously with those of a further scanning operation. The carriage 27 could effect the read-only strokes at high speed and the reading and printing stroke at the maximum allowable printer speed to enable sufficient cooling of the thermal elements 58 after printing a dot.

I claim:

1. A thermal serial dot printer having a frame, a thermal printing head comprising a flat support carrying a column of thermal printing elements, an elongated flat platen for supporting the printing paper, a carriage for carrying said printing head, said carriage being slidably and rockably mounted on a shaft stationary on said frame and guided by a transverse bar, said shaft and said bar being parallel to said platen, said bar being spring urged toward said platen, means for reciprocally moving said carriage on said shaft and said bar along a printing line, a pair of rollers having the axis substantially parallel to said platen and located on opposite sides with respect to said printing line, a pair of bearings for mounting the two ends of each roller on said frame, and means for rotating said rollers at slightly different rates to keep the paper under tension on said platen, wherein the improvement includes an eccentric for supporting at least one of the bearings of one of said rollers, and means for mounting said eccentric on said frame in an angularly adjustable position.

* * * * *